United States Patent

[11] 3,621,982

| [72] | Inventors | Fred J. Fleischauer<br>Oakmont, Pa.;<br>Theodore A. Hammond, Grand Haven, Mich. |
|---|---|---|
| [21] | Appl. No. | 793,666 |
| [22] | Filed | Jan. 24, 1969 |
| [45] | Patented | Nov. 23, 1971 |
| [73] | Assignees | General Logistics Corporation<br>Oakmont, Pa.<br>by said Hammond;<br>Ermanco Incorporated<br>Grand Haven, Mich., by said Hammond |

[54] SELF-ENERGIZING BRAKE FOR ROLLER CONVEYORS
5 Claims, 7 Drawing Figs.

[52] U.S. Cl. .................................................. 198/127,
198/34, 198/160
[51] Int. Cl. .................................................. B65g 13/02
[50] Field of Search .................................. 198/127, 34, 160

[56] References Cited
UNITED STATES PATENTS

| 1,875,436 | 9/1932 | Frese | 188/77 X |
| 1,924,899 | 8/1933 | Anderson | 193/35 A |
| 2,194,219 | 3/1940 | Eggleston | 198/127 |
| 3,012,652 | 12/1961 | Poel et al. | 198/127 |
| 3,116,823 | 1/1964 | Schneider | 198/127 X |
| 3,255,865 | 6/1966 | Sullivan | 198/127 |
| 3,420,355 | 1/1969 | De Good et al. | 198/127 |

*Primary Examiner*—Albert J. Makay
*Attorney*—Wolfe, Hubbard, Leydig, Voit & Osann Ltd.

ABSTRACT: A brake for a zero pressure accumulation roller conveyor is disclosed in which a flexible band is disposed against certain individually powered conveyor rollers to apply a self-energizing frictional braking force upon being tensioned by a downstream triggering device.

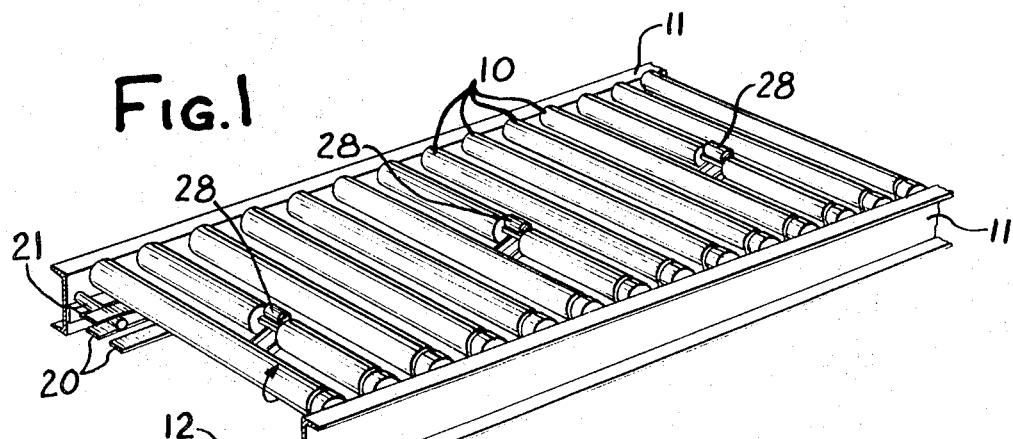

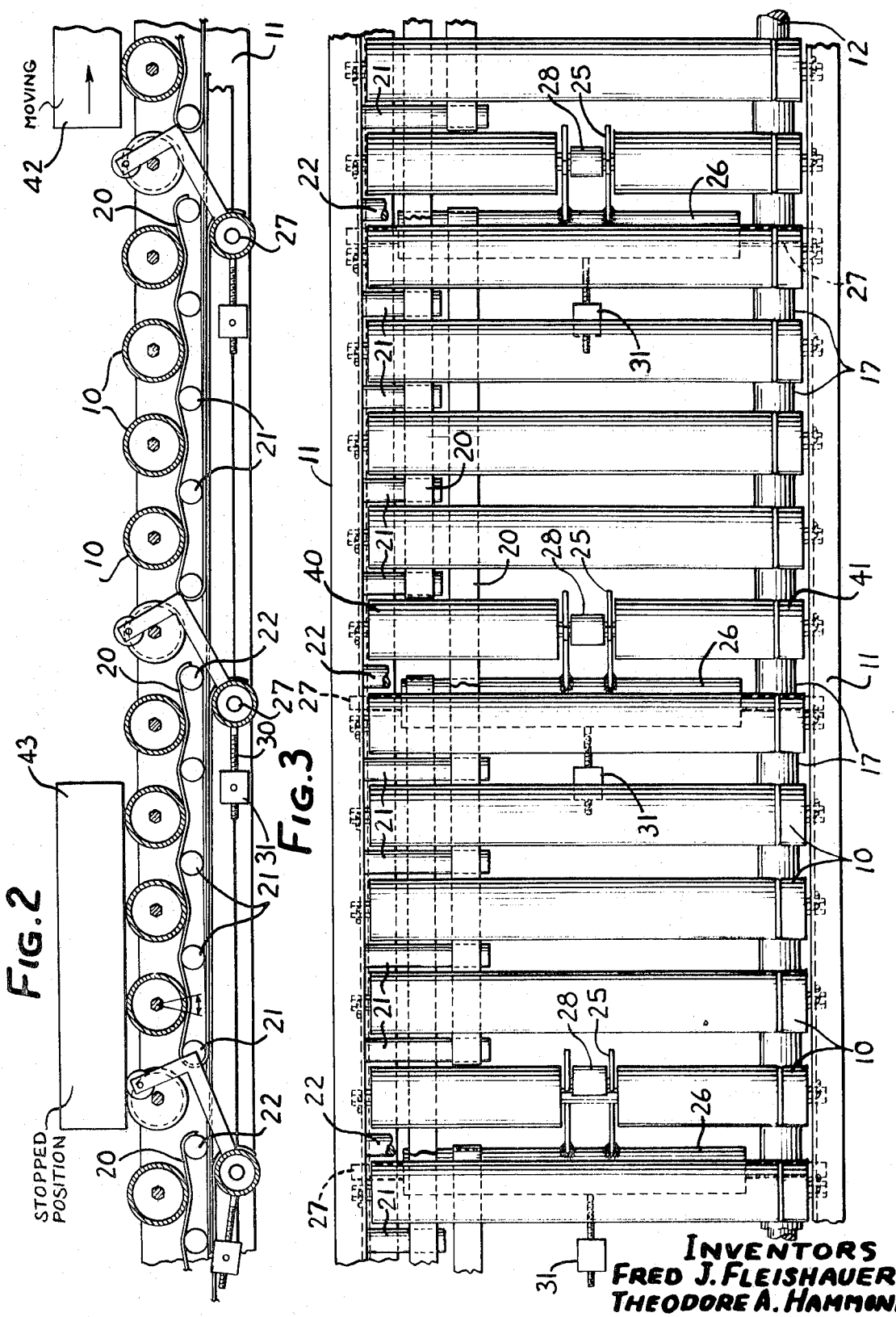

3,621,982

SELF-ENERGIZING BRAKE FOR ROLLER CONVEYORS

DESCRIPTION OF THE INVENTION

This invention relates to conveyors, and in particular to roller conveyors used to transport individual objects along a pass line. In its principal aspect the invention concerns a self-energizing brake for a zero pressure accumulation roller conveyor which is effective to prevent jamming, pressure buildup and overrun of conveyed objects.

A principal object of the present invention is to provide a braking system for roller conveyors which is effective to slow or stop the movement of individual conveyed objects to prevent them from running together and jamming, or from building up a potentially damaging accumulation of forward pressure against a stoppage. It is intended in particular to provide a braking means for such conveyors which will accumulate the conveyed objects at predetermined spaced intervals upstream of a stoppage.

A related object to the above is to provide a conveyor braking means for the foregoing purposes which is self-energizing, that is, an increased deceleration load on the mechanism will impart a correspondingly increased frictional braking force, with the kinetic energy of the braked object being transformed into increased braking effect.

It is further intended to provide a braking means of the above description which is particularly adapted to live-roller conveyors in which each roller is individually powered.

Other objects and advantages of the invention will become apparent from reading the following detailed description in conjunction with the drawings, in which:

FIG. 1 shows in perspective a portion of a live-roller accumulation conveyor exemplifying the present invention;

FIG. 2 is a side elevation in section of the accumulation conveyor of FIG. 1 showing objects being conveyed along a pass line;

FIG. 3 is a plan view of the structure shown in FIG. 2;

FIG. 4 is an enlarged partial side elevation of the drive system for the live-roller conveyor of the preceding figures;

FIG. 5 is a detail side elevation of the triggering apparatus shown in FIG. 2;

FIG. 6 is a first alternative construction of the triggering apparatus of FIG. 5; and FIG. 7 is a second alternative triggering apparatus.

While the invention is described in connection with certain illustrative preferred embodiments, it will be understood that the invention is not restricted to the particular uses and applications shown and described herein, but on the contrary may be utilized in all accumulation conveyor applications wherein accurately controlled and proportional braking effect is required to assure proper operation.

Turning now to the drawings, there is shown in FIG. 1 an exemplary live-roller accumulation conveyor in which individually powered transverse rollers 10 are supported by longitudinal side members 11 for rotation. The upper surfaces of the individual rollers 10 are disposed on a common plane and define a pass line along which conveyed objects are propelled.

The rollers 10 are each individually driven from a drive shaft 12 positioned beneath the pass line and aligned in the direction of conveyor movement. A motor 13 drives the shaft 12 by way of a belt 15 and pulleys. Spaced along the length of the drive shaft 12 are a plurality of friction spools 16, one for each roller 10. Interposed between each pair of spools 16 is a spacer member 17. The spools 16 are not rigidly clamped to the shaft 12, but are instead provided with a small amount of clearance so that they may slip when required.

Power is transferred from each spool 16 to its associated roller 10 through a resilient elastomeric drive belt 18 such as an O-ring. The belt 18 is looped around the spool 16, turned 90°, and looped over a corresponding groove at one end of the roller 10. The elastomeric properties of the belt 18 allow it to stretch somewhat in accommodating itself to the spacing between the roller 10 and the drive shaft 12, thus applying a preload tending to pull the sleeve 16 to one side of the shaft 12. This preload provides a controlled degree of coupling friction between the shaft 12 and the sleeve 16.

The individual rollers 10 are conventional construction, being supported by ball bearings (not shown) on hex shafts 19 carried by the nonslipping members 11.

Under ordinary operating conditions, the frictional coupling between the shaft 12 and the various sleeves 16 is sufficient to provide a nonslipping transmission of power to each roller 10. However, as will be pointed out further herein, a load on a given roller 10 which exceeds a predetermined value will break the solid connection between the shaft 12 and its associated spool 16, stopping the roller 10 while the shaft 12 continues to turn and continues to drive the remaining rollers in the conveyor. When the excessive load is removed, the stopped roller 10 again begins to turn.

Pursuant to the invention, means are provided to arrest or brake certain rollers or groups of rollers along the path of conveyor movement in response to a triggering signal which indicates a conveyor stoppage. Conveyed objects cannot then pass the arrested group of rollers and are therefore prevented from catching up with objects ahead of them and causing a further jam or pressure buildup. When the stoppage is removed, the objects continue forward as before at predetermined spaced intervals. To accomplish this objective, a flexible brake band 20 is disposed beneath certain associated groups of rollers 10 in a manner which will arrest the movement of these rollers when tension is applied to one end of the band. The band 20 is positioned beneath each associated roller 10 by a pair of support pegs 21 on each side of the roller 10. At one end, the band is anchored to an anchor peg 22. From the anchor peg 22 the band is disposed in serpentine fashion between the rollers 10 and the support pegs 21 so that when tensioned, the band 20 will wrap against the periphery of each roller 10 at a predetermined angle of band wrap, as indicated in FIG. 2. The opposite end of the band 20 is looped around the support peg 21 in the group most upstream with respect to conveyor movement, and then disposed downstream to a point where it is connected to a tensioning means, of which three types are shown (FIGS. 5–7).

It is a feature of the invention that the band 20 is disposed in a manner which provides a self-energizing effect when it is tensioned. It will be observed in FIG. 2 that the anchor peg 22 is positioned to resist the frictional force induced in the band by the rotation of the rollers 10 under braking. The braking force generated by the first roller upstream of the anchor peg 22 tends to pull the band away from the anchor peg 22, the next roller 10 upstream adds to this frictional force and tends to more tightly draw the band 20 against the preceding roller. This effect is additive as more rollers are added to the group associated with a single band 20. The braking force applied to each roller thus increases in a downstream direction in the particular group of rollers with which it is associated, with the roller 10 closest to the anchor peg 22 receiving the greatest amount of frictional braking effect.

Since the individual rollers 10 are powered by means of the slipable connection between the spools 16 and the drive shaft 12, it can be seen that upon the application of braking force to tension the band 20 in a given group of rollers 10 the rollers will be slowed or stopped, particularly those closest to the anchor peg 22. If the tensioning force is sufficient, the rollers will tend to arrest the travel of any conveyed object entering upon them.

As provided for by the invention, the tensioning means for each band 20 is actuated by the presence of a conveyed object at a predetermined trigger position on the pass line downstream of the roller or rollers to be braked. One means of applying tension to the band 20 is shown in FIG. 5 in which a trigger lever 25 is carried on a rotatable sleeve 26 mounted on a trigger pivot 27 carried by the side channel members 11 of the conveyor. The band 20 is affixed to the surface of the trigger sleeve 26 so that when the latter is rotated the band 20 is drawn around the sleeve 26 and thereby tensioned. At the upper end of the trigger lever 25 is a trigger roller 28 which protrudes above the pass line into the path of conveyed objects. It will be noticed that the trigger roller 28 is disposed slightly downstream of the centerline of the trigger pivot 27 so that the lever 25 is swingable in a downward direction upon encountering a conveyed object by the trigger roller 28. At the other side of the trigger sleeve 26 is a counterweight shaft 30 and an adjustable counterweight 31 which allows the idling or noload tension on the belt 20 to be selectively adjusted so that the rollers 10 associated with that band 20 are allowed to rotate freely until a conveyed object rides over the trigger roller 28 and tensions the band 20.

In FIG. 6 there is shown a first alternative embodiment of the trigger structure of FIG. 5, differing from the former only in that a return spring 32 is provided in place of the counterweight shaft 30 and adjustable counterweight 31 of the former embodiment. The spring 32 is preferably made adjustable for the same reason that the counterweight 31 of the previous embodiment is adjustable.

A second alternative embodiment is shown in FIG. 7 in which the trigger lever 25 and small trigger roller 28 are replaced by a larger trigger roller 33 of substantially the same diameter as the powered rollers 10. The trigger roller 33 is not powered as are the rollers 10, but is free to rotate within narrow angular limits as determined by a protruding dog 35 which is free to swing within the arc determined by a pair of limit pins 36. (Other equivalent means of limiting the freedom of rotation of the trigger roller 33 may be employed without departing from the invention.) In this embodiment the brake band 20 runs from a positioning peg 37 to the periphery of a reduced diameter shaft segment 38 extending from the trigger roller 33. The band 20 is affixed to the shaft segment 38 in the same manner as the corresponding band 20 on the trigger sleeve 26 in the embodiment of FIG. 5. The periphery of the trigger roller 33 at the pass line is provided with a surface which produces a controlled degree of friction so that the passage of a conveyed object over the trigger roller 33 will tend to rotate it in a manner applying the requisite tension to the brake band 20. If desired, the periphery of the trigger roller 33 may be disposed somewhat above the pass line to assure proper frictional contact with a conveyed object, such as by making the diameter of the trigger roller 33 slightly larger than the powered rollers 10.

If the trigger means were disposed immediately downstream of the group of rollers which it controls, then a conveyed object might stop itself by depressing the trigger means with its forward end, and thereby arresting forward progress of the remaining rollers on which it rested. To eliminate this problem, the trigger means are preferably disposed at intervals whereby a group of rollers 10 are controlled not by the trigger means immediately downstream, but by the next succeeding trigger means.

To accomplish the foregoing, it will be seen from FIG. 3 that the brake bands 20 of each succeeding group of rollers 10 are disposed in staggered fashion, overlapping one another so that a given trigger means controls a group of rollers 10 spaced two intervals upstream of itself.

Operation of the foregoing apparatus is best shown in FIGS. 2 and 3 where it may be seen that the braked rollers 10 are exposed in adjacent groups of four, each separated by a split roller having an undriven section 40 and a driven section 41. It may be seen that the roller segments 40, 41 define an open section at their center where the trigger lever 25 may protrude, thereby presenting a trigger roller 28 above the pass line to be activated by a passing conveyed object. A first package 42 is shown in FIG. 2 as an exemplary conveyed object, being illustrated as it leaves one trigger means. A second package 43 is shown in the position where its forward progress was previously arrested by the trigger means just released by the preceding package 42. It can be seen that the second package 43 has been carried forward by its forward momentum onto a section of rollers 10 which had until that moment been braked by the preceding package 42. The package 43 is about to be accelerated forward as the rollers 10 on which it rests are unbraked. Once the stoppage is removed and the objects are enabled to be freely carried forward again, they will maintain their spacing on the conveyor as determined by the interval between each trigger means and the rollers 10 which it controls, without bunching or contacting one another even if a further stoppage should occur.

We claim:

1. In a conveyor having a plurality of spaced individually powered rollers having a normal direction of forward rotation and defining a pass line tangent to the upper surfaces of said rollers, a brake comprising in combination, a flexible band disposed adjacent the periphery of one of said powered rollers apart from the pass line, band positioning means for supporting the band against said roller at a predetermined angle of band wrap against the periphery of said roller, selectively operable band tensioning means at one end of said band, and said band being anchored against movement relative to said one roller on an end opposite said band tensioning means, with said anchor resisting the frictional force induced in said band during forward roller rotation and the tensioning means being assisted by said frictional force whereby the braking device is self-energizing.

2. A conveyor comprising in combination, a plurality of spaced individually powered rollers defining a pass line tangent to the upper surfaces of said rollers, a power source, a slippable transmission means connecting each individually powered roller to its respective power source, a brake comprising a flexible band disposed adjacent the periphery of one of said powered rollers apart from the pass line, band positioning means for supporting the band against said roller at a predetermined angle of band wrap against the periphery of said roller, and selectively operable means at one end of said band for tensioning said band to apply a frictional braking force to said power roller and reduce the rotational speed of said roller.

3. In a conveyor having a plurality of spaced individually powered rollers defining a pass line tangent to the upper surfaces of said rollers, a brake comprising in combination, a flexible band disposed adjacent the periphery of one of said powered rollers apart from the pass line, band positioning means for supporting the band against said roller at a predetermined angle, selectively operable means at one end of said band for tensioning said band to apply a frictional braking force to said power roller and reduce the rotational speed of said roller, and means responsive to the presence of a conveyed object at a predetermined position on said pass line downstream of said one roller for operating said band tensioning means.

4. Apparatus as defined in claim 3 in which said tensioning means includes a trigger means protruding above the pass line into the path of conveyed objects, said lever being swingable in a downward direction upon encountering a conveyed object.

5. Apparatus as defined in claim 3 in which said tensioning means includes a trigger roller substantially tangent to the pass line and having a friction-producing surface, and having linkage means for translating rotation of said trigger roller into tensioning movement of said band.

* * * * *